(12) United States Patent
Machida et al.

(10) Patent No.: US 9,050,883 B2
(45) Date of Patent: Jun. 9, 2015

(54) CLUTCH FOR TRANSMISSION

(75) Inventors: Shoji Machida, Wako (JP); Masanori Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/124,133

(22) PCT Filed: Apr. 17, 2012

(86) PCT No.: PCT/JP2012/060328
§ 371 (c)(1),
(2), (4) Date: Dec. 5, 2013

(87) PCT Pub. No.: WO2012/172863
PCT Pub. Date: Dec. 20, 2012

(65) Prior Publication Data
US 2014/0109704 A1    Apr. 24, 2014

(30) Foreign Application Priority Data

Jun. 16, 2011    (JP) .................................. 2011-133812

(51) Int. Cl.
*B60K 17/02*    (2006.01)
*F16D 21/06*    (2006.01)
*F16D 25/0638*    (2006.01)

(52) U.S. Cl.
CPC ........... *B60K 17/02* (2013.01); *Y10T 74/19228* (2015.01); *F16D 21/06* (2013.01); *F16D 25/0638* (2013.01)

(58) Field of Classification Search
CPC . F16D 21/06; F16D 2021/0684; F16D 25/02; F16D 25/10; F16D 25/0638; F16D 25/0635; F16D 25/061; B60K 17/00; Y10T 74/19228

USPC .................................................. 74/330, 331
See application file for complete search history.

(56) References Cited

U.S. PATENT DOCUMENTS 3,498,150 A * 3/1970 Funk ............................... 74/331
3,614,902 A * 10/1971 Candellero ...................... 74/555

(Continued)

FOREIGN PATENT DOCUMENTS

DE    102008005239 A1 *    7/2009  .............. F16H 57/04
JP    55044105 A *    3/1980  .............. F16D 67/04

(Continued)

OTHER PUBLICATIONS

International Search Report of PCT/JP2012/060328, mailing date of Jul. 10, 2012.

*Primary Examiner* — William Kelleher
*Assistant Examiner* — Bobby Rushing, Jr.
(74) *Attorney, Agent, or Firm* — Westerman, Hattori, Daniels & Adrian, LLP

(57) ABSTRACT

A clutch for a transmission is provided in which a transmission case includes a first wall portion and a second wall portion that define a clutch housing chamber for housing a clutch outer, a clutch inner, a friction member, and an extension portion of a first gear shaft that extends from a shaft end portion of a second gear shaft, the clutch outer is supported on the first wall portion via a first bearing, and the clutch inner is supported on the through hole of the second wall portion, through which the first gear shaft extends, via a second bearing, and therefore, it is possible to enhance the coaxiality of the clutch outer and the clutch inner by supporting them on the transmission case independently from the first and second gear shafts, prevent the torque transmission capacity of the clutch from decreasing, and avoid the occurrence of judder.

3 Claims, 2 Drawing Sheets

(56) References Cited

U.S. PATENT DOCUMENTS

| | | | | |
|---|---|---|---|---|
| 4,398,432 | A * | 8/1983 | Quick | 74/331 |
| 4,858,492 | A * | 8/1989 | Takano et al. | 74/745 |
| 2008/0296082 | A1 | 12/2008 | Ogasawara et al. | |
| 2010/0109461 | A1* | 5/2010 | Kato et al. | 310/90 |
| 2010/0167853 | A1* | 7/2010 | Morita | 474/13 |
| 2010/0243395 | A1* | 9/2010 | Wiesneth | 192/48.1 |
| 2010/0288064 | A1* | 11/2010 | Singh et al. | 74/330 |

FOREIGN PATENT DOCUMENTS

| | | | | |
|---|---|---|---|---|
| JP | 11-051081 | A | | 2/1999 |
| JP | 2001-099186 | A | | 4/2001 |
| JP | 2005-090664 | A | | 4/2005 |
| JP | 2006336867 | A | * | 12/2006 |
| JP | 2008-298167 | A | | 12/2008 |
| JP | 2011-033157 | A | | 2/2011 |
| JP | 2011-038550 | A | | 2/2011 |

* cited by examiner

CLUTCH FOR TRANSMISSION

TECHNICAL FIELD

The present invention relates to a clutch for a transmission that includes a first gear shaft, a second gear shaft that is coaxially fitted around an outer periphery of the first gear shaft, a first clutch guide member that is fixed to the first gear shaft, a second clutch guide member that is fixed to the second gear shaft, and a friction member that joins the first and second clutch guide members.

BACKGROUND ART

A wet multi-plate type clutch used in an automatic transmission for an automobile is known from Patent Document 1 below. This clutch includes a clutch drum (clutch outer) 51 spline-joined to a countershaft 12, a clutch spline portion (clutch inner) 23c provided integrally with a gear 23b relatively rotatably fitted to the countershaft 12, a clutch plate 55 and a clutch disk 56 disposed between the clutch drum 51 and the clutch spline portion 23c, and a clutch piston 52 that engages the clutch by making the clutch plate 55 and the clutch disk 56 abut against each other.

RELATED ART DOCUMENTS

Patent Documents

Patent Document 1: Japanese Patent Application Laid-open No. 2001-99186

SUMMARY OF THE INVENTION

Problems to be Solved by the Invention

In such a clutch, unless the coaxiality of the clutch outer and the clutch inner is ensured, the clutch plate and the clutch disk cannot abut against each other with a uniform surface pressure when engaged, the torque transmission capacity is thereby degraded, torque variation occurs, and there is a possibility of judder or noise occurring due to the torque variation.

In the invention described in Patent Document 1 above, since the countershaft 12 is supported on the transmission case via a bearing, and the clutch drum 51 and the clutch spline portion 23c are supported on the countershaft 12, there is the problem that vibration from judder occurring in the clutch is transmitted directly to the countershaft 12. If a clutch were to be provided on a main shaft directly connected to an engine, it would attain an eccentric state in which the center of gravity would deviate from the center due to the clutch tilting, particularly when the engine was running idle, and there is a possibility that vibration would occur on the main shaft.

The present invention has been accomplished in light of the above circumstances, and it is an object thereof to suppress vibration of a transmission due to clutch judder.

Means for Solving the Problems

In order to attain the above object, according to a first aspect of the present invention, there is provided a clutch for a transmission comprising: a first gear shaft; a second gear shaft that is coaxially fitted onto an outer periphery of the first gear shaft; a first clutch guide member that is fixed to the first gear shaft; a second clutch guide member that is fixed to the second gear shaft; and friction members that join the first and second clutch guide members, characterized in that a transmission case comprises a first wall portion and a second wall portion that define a clutch housing chamber for housing the first and second clutch guide members, the friction members, and an extension portion of the first gear shaft that extends from a shaft end portion of the second gear shaft, and the first clutch guide member is supported on the first wall portion via a first bearing, and the second clutch guide member is supported via a second bearing on a through hole of the second wall portion through which the first gear shaft extends.

Further, according to a second aspect of the present invention, in addition to the first aspect, the second bearing supports both the second clutch guide member and the second gear shaft on the through hole of the second wall portion.

Furthermore, according to a third aspect of the present invention, in addition to the first or second aspect, the clutch comprises a third bearing between the first clutch guide member and the second clutch guide member.

A first main input shaft 13 of an embodiment corresponds to the first gear shaft of the present invention, a first auxiliary input shaft 15 of the embodiment corresponds to the second gear shaft of the present invention, a clutch outer 58 of the embodiment corresponds to the first clutch guide member of the present invention, a clutch inner 61 of the embodiment corresponds to the second clutch guide member of the present invention, first to third ball bearings 60, 63, and 64 of the embodiment correspond to the first to third bearings of the present invention, and a clutch plate 66 and a clutch disk 67 of the embodiment correspond to the friction member of the present invention.

Effects of the Invention

In accordance with the first aspect of the present invention, the clutch for a transmission includes the first gear shaft, the second gear shaft that is coaxially fitted around the outer periphery of the first gear shaft, the first clutch guide member that is fixed to the first gear shaft, the second clutch guide member that is fixed to the second gear shaft, and the friction member that joins the first and second clutch guide members. Since the transmission case includes the first wall portion and the second wall portion that define the clutch housing chamber for housing the first and second clutch guide members, the friction member, and the extension portion of the first gear shaft that extends from the shaft end portion of the second gear shaft, the first clutch guide member is supported on the first wall portion via the first bearing, and the second clutch guide member is supported on the through hole of the second wall portion, through which the first gear shaft extends, via the second bearing, it is possible to enhance the coaxiality of the first and second clutch guide members by supporting them on the transmission case independently from the first and second gear shafts, prevent the torque transmission capacity of the clutch from decreasing, and avoid the occurrence of judder by suppressing torque variation, thereby reducing vibration of the transmission.

Furthermore, in accordance with the second aspect of the present invention, since the second bearing supports both the second clutch guide member and the second gear shaft on the through hole of the second wall portion, it is possible to use the second bearing in common for supporting the second clutch guide and the second gear shaft, thus cutting the number of components.

Moreover, in accordance with the third aspect of the present invention, since the third bearing is provided between the first clutch guide member and the second clutch guide member, it is possible to enhance the coaxiality of the first and second clutch guide members by the third bearing and, moreover, since a member, such as a shaft, that would cause tilting is not present, it is possible to make friction members of the clutch contact each other with uniform surface pressure, thereby preventing the torque transmission capacity from decreasing.

EXPLANATION OF REFERENCE NUMERALS AND SYMBOLS

Figure 1:
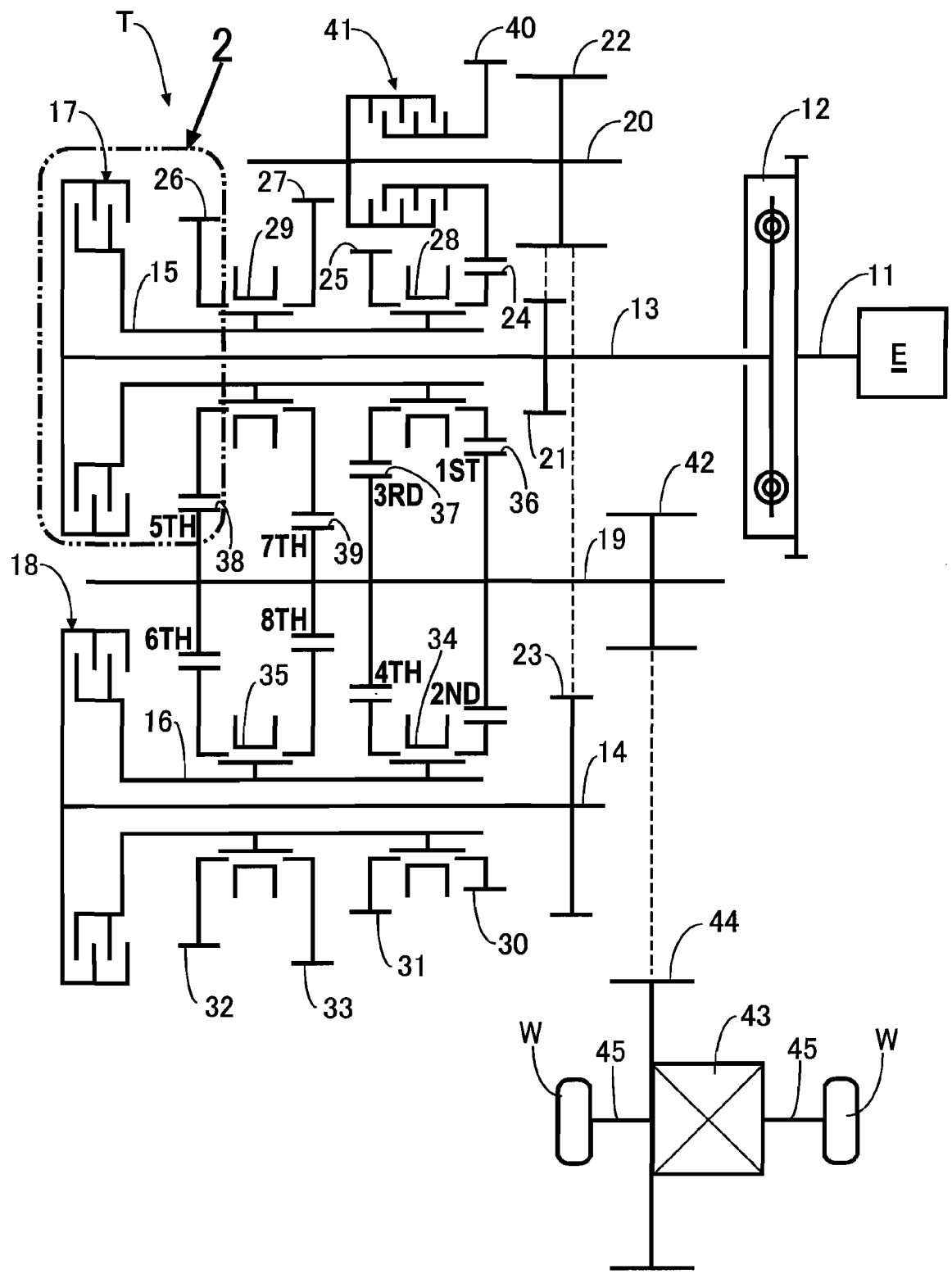
FIG. 1 is a skeleton diagram of a twin clutch type transmission. (first embodiment)

13 First main input shaft (first gear shaft)
13a Extension portion
15 First auxiliary input shaft (second gear shaft)
15a Shaft end portion
53 Transmission case
54a Second wall portion
54b Through hole
55a First wall portion
56 Clutch housing chamber
58 Clutch outer (first clutch guide member)
60 First ball bearing (first bearing)
61 Clutch inner (second clutch guide member)
63 Second ball bearing (second bearing)
64 Third ball bearing (third bearing)
66 Clutch plate (friction member)
67 Clutch disk (friction member)

MODES FOR CARRYING OUT THE INVENTION

A mode for carrying out the present invention is explained below by reference to FIG. 1 and FIG. 2.

First Embodiment

Figure 2:
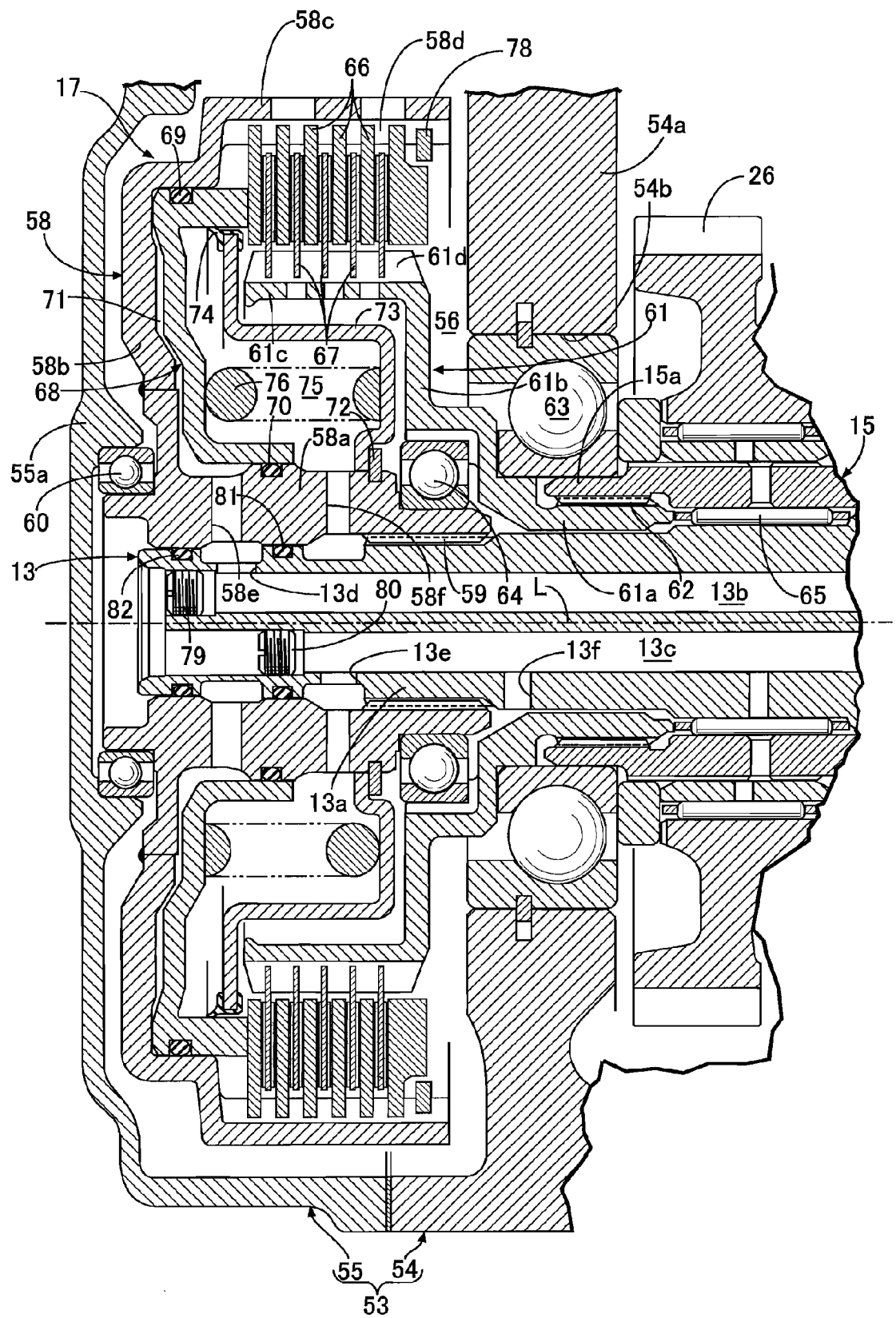
FIG. 2 is an enlarged view of part shown by 2 in FIG. 1. (first embodiment)

As shown in FIG. 1, a twin clutch type transmission T for an automobile includes a first main input shaft 13 coaxially connected to a crankshaft 11 of an engine E via a damper 12 and a second main input shaft 14 disposed in parallel to the first main input shaft 13. A first auxiliary input shaft 15 and a second auxiliary input shaft 16, which are tubular, are relatively rotatably fitted around the outer peripheries of the first main input shaft 13 and the second main input shaft 14. The first main input shaft 13 and the first auxiliary input shaft 15 can be joined via a first clutch 17, and the second main input shaft 14 and the second auxiliary input shaft 16 can be joined via a second clutch 18.

An output shaft 19 and an idle shaft 20 are disposed in parallel to the first main input shaft 13 and the second main input shaft 14. A drive gear 21 fixedly provided on the first main input shaft 13 meshes with an idle gear 22 fixedly provided on the idle shaft 20, and the idle gear 22 meshes with a driven gear 23 fixedly provided on the second main input shaft 14. Therefore, when the engine E is running, the first main input shaft 13 and the second main input shaft 14 are always rotating in the same direction.

Relatively rotatably supported on the first auxiliary input shaft 15 are a first speed drive gear 24, a third speed drive gear 25, a fifth speed drive gear 26, and a seventh speed drive gear 27. The first speed drive gear 24 and the third speed drive gear 25 can be joined selectively to the first auxiliary input shaft 15 via a first speed-third speed synchro device 28, and the fifth speed drive gear 26 and the seventh speed drive gear 27 can be joined selectively to the first auxiliary input shaft 15 via a fifth speed-seventh speed synchro device 29.

Relatively rotatably supported on the second auxiliary input shaft 16 are a second speed drive gear 30, a fourth speed drive gear 31, a sixth speed drive gear 32, and an eighth speed drive gear 33. The second speed drive gear 30 and the fourth speed drive gear 31 can be joined selectively to the second auxiliary input shaft 16 via a second speed-fourth speed synchro device 34, and the sixth speed drive gear 32 and the eighth speed drive gear 33 can be joined selectively to the second auxiliary input shaft 16 via a sixth speed-eighth speed synchro device 35.

Fixedly provided on the output shaft 19 are a first speed-second speed driven gear 36, a third speed-fourth speed driven gear 37, a fifth speed-sixth speed driven gear 38, and a seventh speed-eighth speed driven gear 39. The first speed-second speed driven gear 36 simultaneously meshes with the first speed drive gear 24 and the second speed drive gear 30. The third speed-fourth speed driven gear 37 simultaneously meshes with the third speed drive gear 25 and the fourth speed drive gear 31. The fifth speed-sixth speed driven gear 38 simultaneously meshes with the fifth speed drive gear 26 and the sixth speed drive gear 32. The seventh speed-eighth speed driven gear 39 simultaneously meshes with the seventh speed drive gear 27 and the eighth speed drive gear 33.

Relatively rotatably supported on the idle shaft 20 is a reverse idle gear 40 that meshes with the first speed drive gear 24 of the first auxiliary input shaft 15. The reverse idle gear 40 can be joined to the idle shaft 20 via a reverse clutch 41.

A final drive gear 42 fixedly provided on the output shaft 19 meshes with a final driven gear 44 fixedly provided on a differential gear 43, and axles 45 and 45 extending to the left and right from the differential gear 43 are connected to left and right driven wheels W and W.

Therefore, when the first clutch 17 is engaged in a state in which the first speed drive gear 24 is joined to the first auxiliary input shaft 15 by means of the first speed-third speed synchro device 28, rotation of the first main input shaft 13 is transmitted to the differential gear 43 via the path: first clutch 17→first auxiliary input shaft 15→first speed-third speed synchro device 28→first speed drive gear 24→first speed-second speed driven gear 36→output shaft 19→final drive gear 42→final driven gear 44, thus establishing a first speed gear position.

Furthermore, when the second clutch 18 is engaged in a state in which the second speed drive gear 30 is joined to the second auxiliary input shaft 16 by means of the second speed-fourth speed synchro device 34, rotation of the second main input shaft 14 is transmitted to the differential gear 43 via the path: second clutch 18→second auxiliary input shaft 16→second speed-fourth speed synchro device 34→second speed drive gear 30→first speed-second speed driven gear 36→output shaft 19→final drive gear 42→final driven gear 44, thus establishing a second speed gear position.

Moreover, when the first clutch 17 is engaged in a state in which the third speed drive gear 25 is joined to the first auxiliary input shaft 15 by means of the first speed-third speed synchro device 28, rotation of the first main input shaft 13 is transmitted to the differential gear 43 via the path: first clutch 17→first auxiliary input shaft 15→first speed-third speed synchro device 28→third speed drive gear 25→third speed-fourth speed driven gear 37→output shaft 19→final drive gear 42→final driven gear 44, thus establishing a third speed gear position.

Furthermore, when the second clutch 18 is engaged in a state in which the fourth speed drive gear 31 is joined to the second auxiliary input shaft 16 by means of the second speed-fourth speed synchro device 34, rotation of the second main input shaft 14 is transmitted to the differential gear 43 via the path: second clutch 18→second auxiliary input shaft 16→second speed-fourth speed synchro device 34→fourth speed drive gear 31→third speed-fourth speed driven gear 37→output shaft 19→final drive gear 42→final driven gear 44, thus establishing a fourth speed gear position.

Moreover, when the first clutch 17 is engaged in a state in which the fifth speed drive gear 26 is joined to the first auxiliary input shaft 15 by means of the fifth speed-seventh speed synchro device 29, rotation of the first main input shaft 13 is transmitted to the differential gear 43 via the path: first clutch 17→first auxiliary input shaft 15→fifth speed-seventh speed synchro device 29→fifth speed drive gear 26→fifth speed-sixth speed driven gear 38→output shaft 19→final drive gear 42→final driven gear 44, thus establishing a fifth speed gear position.

Furthermore, when the second clutch 18 is engaged in a state in which the sixth speed drive gear 32 is joined to the second auxiliary input shaft 16 by means of the sixth speed-eighth speed synchro device 35, rotation of the second main input shaft 14 is transmitted to the differential gear 43 via the path: second clutch 18→second auxiliary input shaft 16→sixth speed-eighth speed synchro device 35→sixth speed drive gear 32→fifth speed-sixth speed driven gear 38→output shaft 19→final drive gear 42→final driven gear 44, thus establishing a sixth speed gear position.

Moreover, when the first clutch 17 is engaged in a state in which the seventh speed drive gear 27 is joined to the first auxiliary input shaft 15 by means of the fifth speed-seventh speed synchro device 29, rotation of the first main input shaft 13 is transmitted to the differential gear 43 via the path: first clutch 17→first auxiliary input shaft 15→fifth speed-seventh speed synchro device 29→seventh speed drive gear 27→seventh speed-eighth speed driven gear 39→output shaft 19→final drive gear 42→final driven gear 44, thus establishing a seventh speed gear position.

Furthermore, when the second clutch 18 is engaged in a state in which the eighth speed drive gear 33 is joined to the second auxiliary input shaft 16 by means of the sixth speed-eighth speed synchro device 35, rotation of the second main input shaft 14 is transmitted to the differential gear 43 via the path: second clutch 18→second auxiliary input shaft 16→sixth speed-eighth speed synchro device 35→eighth speed drive gear 33→seventh speed-eighth speed driven gear 39→output shaft 19→final drive gear 42→final driven gear 44, thus establishing an eighth speed gear position.

Moreover, when the reverse clutch 41 is engaged, rotation of the first main input shaft 13 is reversed and transmitted to the differential gear 43 via the path: drive gear 21→idle gear 22→idle shaft 20→reverse clutch 41→reverse idle gear 40→first speed drive gear 24→first speed-second speed driven gear 36→output shaft 19→final drive gear 42→final driven gear 44, thus establishing a reverse gear position.

The specific structure of the first clutch 17 is now explained by reference to FIG. 2.

A transmission case 53 is formed by integrally joining a right-side case main body 54 and a left-side case cover 55. The wet multi-plate type first clutch 17 is disposed in a clutch housing chamber 56 defined between the case main body 54 and the case cover 55. When the first clutch 17 is engaged, the first main input shaft 13 and the first auxiliary input shaft 15 are integrally joined to transmit a driving force, and when the first clutch 17 is disengaged, the first main input shaft 13 and the first auxiliary input shaft 15 are detached from each other to cut off transmission of the driving force.

The first main input shaft 13, which is positioned on the radially inner side, is longer than the first auxiliary input shaft 15, which is positioned on the radially outer side, and an extension portion 13a of the first main input shaft 13 extends leftward from a shaft end portion 15a of the first auxiliary input shaft 15. With regard to a clutch outer 58 forming a first clutch guide member of the first clutch 17, a tubular boss portion 58a formed on an inner peripheral part is fitted around an outer peripheral face of the extension portion 13a of the first main input shaft 13 and relatively non-rotatably fixed by means of a spline joint 59. A cylindrical guide portion 58c extends rightward from the radially outer end of a side wall portion 58b extending radially outward from the left end of the boss portion 58a, and a spline 58d is formed on an inner peripheral face of the guide portion 58c. With regard to the clutch outer 58, a left end part of the boss portion 58a is rotatably supported on a first wall portion 55a of the case cover 55 of the transmission case 53 via a first ball bearing 60.

With regard to a clutch inner 61 forming a second clutch guide member of the first clutch 17, a cylindrical boss portion 61a formed on an inner peripheral part is fitted into an inner peripheral face of the shaft end portion 15a of the first auxiliary input shaft 15 and relatively non-rotatably fixed by means of a spline joint 62. A cylindrical guide portion 61c extends leftward from the radially outer end of a side wall portion 61b extending radially outward from the left end of the boss portion 61a, and a spline 61d is formed on an outer peripheral face of the guide portion 61c.

A circular through hole 54b is formed in a second wall portion 54a of the case main body 54 of the transmission case 53, the first main input shaft 13 extending through the through hole 54b. With regard to the clutch inner 61, its side wall portion 61b is rotatably supported on a left half of an inner race of a second ball bearing 63 fitted in the through hole 54b. The shaft end portion 15a of the first auxiliary input shaft 15 is rotatably supported on a right half of the inner race of the second ball bearing 63. A third ball bearing 64 is disposed between a right end part of the boss portion 58a of the clutch outer 58 and the side wall portion 61b of the clutch inner 61.

In this way, since the clutch outer 58 is supported on the first wall portion 55a of the case cover 55 of the transmission case 53 via the first ball bearing 60 so as to be rotatable around an axis L, the clutch inner 61 is supported on the second wall portion 54a of the case main body 54 of the transmission case 53 via the second ball bearing 63 so as to be rotatable around the axis L, and the clutch outer 58 and the clutch inner 61 are positioned relative to each other in the radial direction via the third ball bearing 64, the coaxiality of the clutch outer 58 and the clutch inner 61 is ensured. As a result, it becomes possible to make the surface pressure between contacting surfaces of clutch plates 66 and clutch disks 67 uniform and prevent the torque transmission capacity of the first clutch 17 from decreasing, thus avoiding the occurrence of judder.

The first main input shaft 13 and the first auxiliary input shaft 15 are relatively rotatably fitted via a needle bearing 65, the first main input shaft 13 is supported on the case cover 55 indirectly via the clutch outer 58 and the first ball bearing 60, and the first auxiliary input shaft 15 is supported on the case main body 54 directly via the clutch inner 61.

Outer peripheral parts of the plurality of clutch plates 66 are fitted to the spline 58d of the guide portion 58c of the clutch outer 58 relatively non-rotatably and slidably in the axis L direction, inner peripheral parts of the plurality of clutch disks 67 are fitted to the spline 61d of the guide portion 61c of the clutch inner 61 relatively non-rotatably and slidably in the axis L direction, and the clutch plates 66 and the clutch disks 67 are alternately superimposed so as to be able to abut against each other.

An annular clutch piston 68 is fitted into the interior of the clutch outer 58 slidably in the axis L direction, and a clutch oil chamber 71, which is sealed by seal members 69 and 70, is defined between the clutch piston 68 and the clutch outer 58. An outer peripheral part of a spring seat 73, whose inner peripheral part is retained by a clip 72 to the right end of the boss portion 58a of the clutch outer 58, slidably abuts against the clutch piston 68 via the seal member 74. A clutch spring 76 is provided in a compressed state in a canceller oil chamber 75 defined between the clutch piston 68 and the spring seat 73. A clip 78 is provided on the spline 58d of the clutch outer 58, the clip 78 retaining the clutch plate 66 at the right end.

Formed in the axis L direction in the interior of the first main input shaft 13 are a hydraulic oil passage 13b and a lubricating oil passage 13c, left ends thereof being blocked by plugs 79 and 80 respectively. The hydraulic oil passage 13b communicates with the clutch oil chamber 71 via an oil hole 13d of the first main input shaft 13 and an oil passage 58e of the boss portion 58a of the clutch outer 58. The lubricating oil passage 13c communicates with the canceller oil chamber 75 via an oil hole 13e of the first main input shaft 13 and an oil passage 58f of the boss portion 58a of the clutch outer 58, and an oil hole 13f of the first main input shaft 13 communicates with an inner peripheral part of the clutch inner 61.

Provided on the outer periphery of the first main input shaft 13 are a seal member 81 for providing a seal between the adjacent oil holes 13d and 13e and a seal member 82 for providing a seal between the oil hole 13d and the shaft end of the first main input shaft 13.

The operation of the embodiment of the present invention having the above arrangement is now explained.

When no hydraulic oil is supplied to the clutch oil chamber 71 of the first clutch 17, the clutch piston 68 is urged leftward by means of the resilient force of the clutch spring 76 disposed in the canceller oil chamber 75, the clutch plates 66 and the clutch disks 67 are detached from each other, and the join between the clutch outer 58 and the clutch inner 61 is released. As a result, even if the clutch outer 58 rotates together with the first main input shaft 13 connected to the engine via the damper 12, the rotation is not transmitted to the first auxiliary input shaft 15 via the clutch inner 61, and the first clutch 17 thus attains a disengaged state.

When hydraulic oil is supplied to the clutch oil chamber 71 via the hydraulic oil passage 13b of the first main input shaft 13, the oil hole 13d of the first main input shaft 13, and the oil passage 58e of the boss portion 58a of the clutch outer 58, the clutch piston 68 moves rightward while compressing the clutch spring 76, and the clutch piston 68 presses the clutch plates 66 and the clutch disks 67 so as to put them into contact with each other. This joins the clutch outer 58 to the clutch inner 61, the clutch 17 attains an engaged state, and rotation of the first main input shaft 13 is transmitted to the first auxiliary input shaft 15.

Lubricating oil of the lubricating oil passage 13c of the first main input shaft 13 is supplied to the canceller oil chamber 75 via the oil hole 13e of the first main input shaft 13 and the oil passage 58f of the boss portion 58a of the clutch outer 58. Since the canceller oil chamber 75 is disposed on the side opposite to the clutch oil chamber 71 with the clutch piston 68 sandwiched therebetween, by balancing an oil pressure generated by centrifugation acting on the hydraulic oil within the clutch oil chamber 71 with an oil pressure generated by centrifugation acting on the lubricating oil within the canceller oil chamber 75, it is possible to prevent the clutch piston 68 from being operated by centrifugal force.

Furthermore, the lubricating oil of the lubricating oil passage 13c of the first main input shaft 13 is made to issue from the oil hole 13f of the first main input shaft 13 by means of centrifugal force to thus lubricate the third ball bearing 64, further flows toward the radially outer side to thus lubricate the clutch plates 66 and the clutch disks 67, and is discharged outside the clutch outer 58.

It is difficult to ensure complete coaxiality of the clutch outer 58 and the clutch inner 61 of the first clutch 17, but if the axis of the clutch outer 58 and the axis of the clutch inner 61 are displaced from one another, since the clutch plates 66 and the clutch disks 67 do not abut against each other with a constant surface pressure, there is a possibility that the torque transmission capacity would decrease and judder would occur.

In accordance with the present embodiment, since the clutch outer 58 is supported on the case cover 55 of the transmission case 53 via the first ball bearing 60, and the clutch inner 61 is supported on the case main body 54 of the transmission case 53 via the second ball bearing 63, the coaxiality of the clutch outer 58 and the clutch inner 61 is enhanced, thus making the surface pressure of the contacting surfaces of the clutch plates 66 and the clutch disks 67 uniform. This ensures that there is sufficient torque transmission capacity of the first clutch 17 and prevents judder from occurring, thus suppressing vibration of the transmission.

Furthermore, since the third ball bearing 64 is disposed between the clutch outer 58 and the clutch inner 61, the coaxiality of the clutch outer 58 and the clutch inner 61 is further enhanced, thus enabling the torque transmission capacity of the first clutch 17 to be increased and the occurrence of judder to be minimized.

Moreover, since the second ball bearing 63 supports both the clutch inner 61 and the first auxiliary input shaft 15 on the through hole 54b of the second wall portion 54a of the case main body 54, it is possible to use the second ball bearing 63 in common for supporting the clutch inner 61 and the first auxiliary input shaft 15, thus reducing the number of components.

An embodiment of the present invention is explained above, but the present invention may be modified in a variety of ways as long as the modifications do not depart from the spirit and scope thereof.

For example, in the embodiment the present invention is applied to the first clutch 17, but it may also be applied to the second clutch 18.

Furthermore, in the embodiment the present invention is applied to a twin clutch of a twin clutch type transmission, but the present invention may be applied to a transmission clutch that engages a transmission gear with a gear shaft and disengages it therefrom. In this case, the second gear shaft of the present invention is formed from a shaft part of the transmission gear relatively rotatably supported on the outer periphery of the first gear shaft.

Moreover, the first to third bearings of the present invention are not limited to the first to third ball bearings 58, 63 and 64 of the embodiment and may be bearings having any structure.

Furthermore, the transmission case 53 of the present invention is not limited to the case main body 54 and the case cover 55 of the embodiment.

The invention claimed is:
1. A clutch for a transmission comprising:
a first gear shaft;
a second gear shaft that is coaxially fitted onto an outer periphery of the first gear shaft;

a first clutch guide member that is fixed to the first gear shaft;

a second clutch guide member that is fixed to the second gear shaft; and friction members that join the first and second clutch guide members, wherein a transmission case comprises a first wall portion and a second wall portion that define a clutch housing chamber for housing the first and second clutch guide members, the friction members, and an extension portion of the first gear shaft that extends from a shaft end portion of the second gear shaft, and the first clutch guide member is supported on the first wall portion via a first bearing, and the second clutch guide member is supported via a second bearing on a through hole of the second wall portion through which the first gear shaft extends, and the second bearing rotatably supports both of an outer peripheral surface of the second clutch guide member and an outer peripheral surface of the second gear shaft on the through hole of the second wall portion such that the outer peripheral surface of the second clutch guide member and the outer peripheral surface of the second gear shaft are positioned adjacent to each other.

2. The clutch for a transmission according to claim 1, comprising a third bearing between the first clutch guide member and the second clutch guide member.

3. The clutch for a transmission according to claim 2, wherein the first clutch guide member is positioned radially inward of the third bearing and the second clutch guide member is positioned radially outward of the third bearing.

* * * * *